(12) United States Patent
Iizawa et al.

(10) Patent No.: US 11,377,085 B2
(45) Date of Patent: Jul. 5, 2022

(54) CONTROLLER AND CONTROL METHOD FOR HYBRID VEHICLE

(71) Applicant: TOYOTA JIDOSHA KABUSHIKI KAISHA, Toyota (JP)

(72) Inventors: Yuki Iizawa, Toyota (JP); Yasutaka Tsuchida, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/197,181

(22) Filed: Mar. 10, 2021

(65) Prior Publication Data
US 2021/0300323 A1  Sep. 30, 2021

(30) Foreign Application Priority Data
Mar. 31, 2020 (JP) .............................. JP2020-063964

(51) Int. Cl.
*B60W 10/06* (2006.01)
*B60W 10/08* (2006.01)
(Continued)

(52) U.S. Cl.
CPC .............. *B60W 20/10* (2013.01); *B60K 6/26* (2013.01); *B60K 6/365* (2013.01); *B60W 10/06* (2013.01);
(Continued)

(58) Field of Classification Search
CPC ...... B60W 20/10; B60W 10/06; B60W 10/08; B60W 10/10; B60W 2510/0638;
(Continued)

(56) References Cited

U.S. PATENT DOCUMENTS 7,062,916 B2 * 6/2006 Kamijo ................. B60W 20/13
60/706
2010/0070122 A1 * 3/2010 Niimi .................. B60L 15/2054
903/930
(Continued)

FOREIGN PATENT DOCUMENTS

JP  2016-164026 A  9/2016
JP  2018-075919 A  5/2018
(Continued)

*Primary Examiner* — Tisha D Lewis
(74) *Attorney, Agent, or Firm* — Finnegan, Henderson, Farabow, Garrett & Dunner, LLP

(57) ABSTRACT

A controller for a hybrid vehicle controls a first motor generator and a second motor generator such that electric power input to a battery does not exceed an input upper limit value and electric power output from the battery does not exceed an output upper limit value. The controller executes motoring to rotate an output shaft using the first motor generator with combustion operation of an engine stopped, thereby causing a braking force generated by friction of the engine to act on a driven wheel. The controller executes a valve-opening limitation process that limits an increase in a throttle open degree in correspondence with the input upper limit value upon issuance of an increase request for the throttle open degree that is not based on an operation of requesting a change in the braking force performed by a driver during the execution of the motoring.

8 Claims, 6 Drawing Sheets

(51) Int. Cl.
*B60W 20/13* (2016.01)
*B60W 20/10* (2016.01)
*B60K 6/26* (2007.10)
*B60W 10/10* (2012.01)
*F02D 41/00* (2006.01)
*B60K 6/365* (2007.10)

(52) U.S. Cl.
CPC ............ *B60W 10/08* (2013.01); *B60W 10/10* (2013.01); *F02D 41/0002* (2013.01); *B60W 2510/0638* (2013.01); *B60W 2510/081* (2013.01); *B60W 2510/244* (2013.01); *B60W 2510/246* (2013.01); *B60W 2540/10* (2013.01); *B60W 2540/12* (2013.01); *B60W 2710/0605* (2013.01); *B60W 2710/0644* (2013.01); *B60W 2710/081* (2013.01); *B60W 2710/1005* (2013.01); *B60Y 2200/92* (2013.01); *B60Y 2300/433* (2013.01); *B60Y 2300/60* (2013.01); *B60Y 2300/70* (2013.01); *B60Y 2400/60* (2013.01); *B60Y 2400/73* (2013.01)

(58) Field of Classification Search
CPC ..... B60W 2510/081; B60W 2510/244; B60W 2510/246; B60W 2540/10; B60W 2540/12; B60W 2710/0605; B60W 2710/0644; B60W 2710/081; B60W 2710/1005; B60K 6/26; B60K 6/365; F02D 41/0002; B60Y 2200/92; B60Y 2300/60; B60Y 2300/70; B60Y 2400/60; B60Y 2400/73

See application file for complete search history.

(56) References Cited

U.S. PATENT DOCUMENTS

| | | |
|---|---|---|
| 2016/0257297 A1 | 9/2016 | Oshiumi et al. |
| 2018/0126979 A1 | 5/2018 | Higa et al. |
| 2020/0164862 A1 | 5/2020 | Muta |

FOREIGN PATENT DOCUMENTS

| | | | |
|---|---|---|---|
| JP | 2020-083002 A | 6/2020 | |
| WO | WO-2006080570 A1 * | 8/2006 | ............ B60K 6/365 |

* cited by examiner

CONTROLLER AND CONTROL METHOD FOR HYBRID VEHICLE

BACKGROUND

1. Field

The present disclosure relates to a controller and a control method for a hybrid vehicle.

2. Description of Related Art

Japanese Laid-Open Patent Publication No. 2016-164026 discloses a hybrid vehicle in which a first motor generator, a second motor generator, and an engine are connected to each other by a power distribution-integration mechanism. The first motor generator, the second motor generator, and the engine cooperate so as to adjust the torque transmitted to the driven wheels. In this hybrid vehicle, a battery is charged and discharged depending on the electric power balance in the first and second motor generators, that is, depending on the relationship between the electric power generated by one of the motor generators and the electric power consumed by the other motor generator.

The above-described document discloses that when the accelerator operation is deactivated, the controller for the hybrid vehicle executes motoring to drive, using the first motor generator, an output shaft of the engine of which the combustion operation is stopped. The execution of the motoring causes a braking force generated by engine friction to act on the driven wheels.

If the throttle open degree is changed while the braking force generated by the engine friction is acting on the driven wheels with the execution of the motoring, the magnitude of the engine friction changes so that the braking force changes. To limit such a change in the braking force, the braking force generated by the second motor generator needs to be controlled such that the sum of the braking force generated by the engine friction and the braking force generated by the second motor generator remains unchanged. However, in some states of the battery, the input and output of electric power to and from the battery may exceed an allowable range when the second motor generator is used to limit a change in the braking force.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a controller for a hybrid vehicle. The hybrid vehicle includes a power distribution-integration mechanism including a ring gear configured to work in an interlocked manner with a driven wheel, a sun gear configured to rotate at a center of the ring gear, a pinion gear located between the sun gear and the ring gear and configured to orbit around the sun gear, and a planetary carrier configured to rotate as the pinion gear orbits. The hybrid vehicle also includes an engine including an output shaft coupled to the planetary carrier, a first motor generator configured to work in an interlocked manner with the sun gear, a second motor generator configured to work in an interlocked manner with the ring gear, and a battery connected to the first motor generator and the second motor generator. The hybrid vehicle further includes a battery controller configured to calculate a state of charge of the battery, an input upper limit value of the battery, and an output upper limit value of the battery, using a voltage in the battery, a temperature of the battery, and an electric power balance in the first and second motor generators. The controller includes circuitry configured to control the first motor generator and the second motor generator such that electric power input to the battery does not exceed the input upper limit value and electric power output from the battery does not exceed the output upper limit value. The circuitry is configured to control the engine and the first motor generator such that an engine rotation speed becomes close to a target engine rotation speed, the target engine rotation speed being set using a requested drive force, and control the second motor generator such that the requested drive force is achieved by power transmitted from the ring gear to the driven wheel. The circuitry is also configured to execute motoring to rotate the output shaft using the first motor generator in a state in which combustion operation of the engine is stopped, thereby causing a braking force generated by friction of the engine to act on the driven wheel. The circuitry is further configured to execute a valve-opening limitation process that limits an increase in a throttle open degree in correspondence with the input upper limit value upon issuance of an increase request for the throttle open degree that is not based on an operation of requesting a change in the braking force performed by a driver during the execution of the motoring.

Another aspect of the present disclosure provides a control method for a hybrid vehicle. The method includes calculating a state of charge of the battery, an input upper limit value of the battery, and an output upper limit value of the battery using a voltage in the battery, a temperature of the battery, and an electric power balance in the first and second motor generators, controlling the first motor generator and the second motor generator such that electric power input to the battery does not exceed the input upper limit value and electric power output from the battery does not exceed the output upper limit value, controlling the engine and the first motor generator such that an engine rotation speed becomes close to a target engine rotation speed, the target engine rotation speed being set using a requested drive force, controlling the second motor generator such that the requested drive force is achieved by power transmitted from the ring gear to the driven wheel, executing motoring to rotate the output shaft using the first motor generator in a state in which combustion operation of the engine is stopped, thereby causing a braking force generated by friction of the engine to act on the driven wheel, and executing a valve-opening limitation process that limits an increase in a throttle open degree in correspondence with the input upper limit value upon issuance of an increase request for the throttle open degree that is not based on an operation of requesting a change in the braking force performed by a driver during the execution of the motoring.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A controller and a control method for a hybrid vehicle according to an embodiment will now be described with reference to FIGS. 1 to 8.

Figure 1:
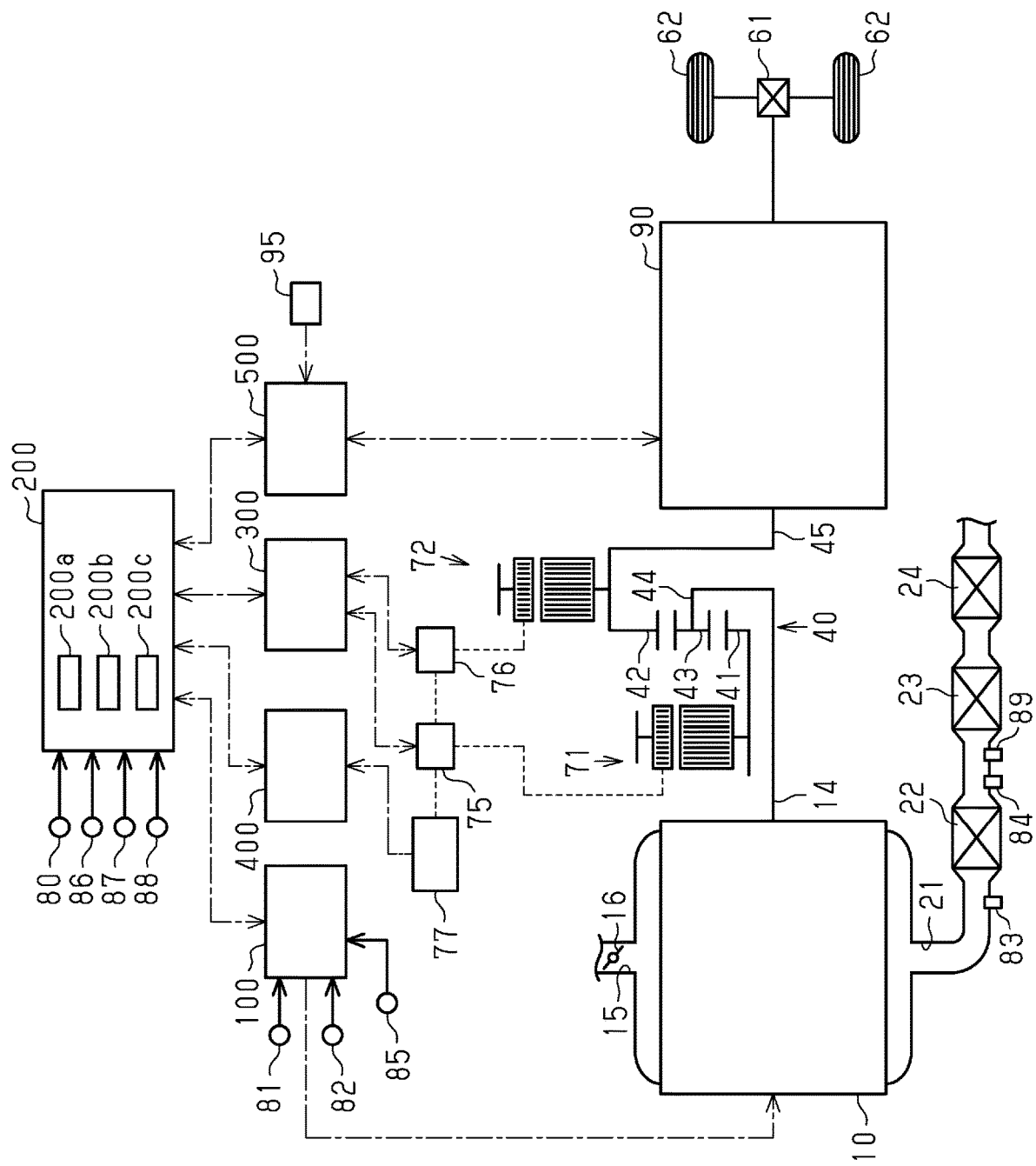
FIG. 1 is a schematic diagram showing the configuration of a hybrid vehicle including a hybrid ECU according to an embodiment.

FIG. 1 schematically shows the configuration of the hybrid vehicle. As shown in FIG. 1, the hybrid vehicle includes an engine 10, a power distribution-integration mechanism 40, which is connected to a crankshaft 14 serving as an output shaft of the engine 10, and first and second motor generators 71, 72, which are connected to the power distribution-integration mechanism 40. The hybrid vehicle further includes a transmission 90, which provides four gear positions, each of the gear positions having a different gear ratio.

The power distribution-integration mechanism 40 is a planetary gear mechanism including a sun gear 41, which is an external gear, and a ring gear 42, which is an internal gear. The sun gear 41 is located at the center of the ring gear 42. Pinion gears 43, which mesh with the sun gear 41 and the ring gear 42, are arranged between the sun gear 41 and the ring gear 42. The pinion gears 43 are supported by a planetary carrier 44 such that the pinion gears 43 can rotate and can orbit around the sun gear 41. The first motor generator 71 is coupled to the sun gear 41. That is, the first motor generator 71 works in an interlocked manner with the sun gear 41.

The crankshaft 14 is coupled to the planetary carrier 44. A ring gear shaft 45 and the second motor generator 72 are connected to the ring gear 42. Thus, the second motor generator 72 coupled to the ring gear 42 works in an interlocked manner with the ring gear 42. The ring gear shaft 45 is connected to an input shaft of the transmission 90.

The transmission 90 is a step transmission of a planetary gear type. The transmission 90 provides four gear positions, from first gear, which has the largest gear ratio, to fourth gear, which has the smallest gear ratio, by selectively engaging engagement devices. The output shaft of the transmission 90 is coupled to driven wheels 62 via a differential 61. The transmission 90 enters a neutral state in which no gear position is provided (i.e., a state in which the transmission of power is blocked) by disengaging all the engagement devices.

The first motor generator 71 exchanges electric power with a battery 77 via a first inverter 75. The second motor generator 72 exchanges electric power with the battery 77 via a second inverter 76.

When the torque from the engine 10 is input to the planetary carrier 44 of the power distribution-integration mechanism 40, the torque is distributed to the sun gear 41 and the ring gear 42. Rotating the first motor generator 71 by the torque distributed to the sun gear 41 allows the first motor generator 71 to function as a generator.

In the case of causing the first motor generator 71 to function as a motor, the torque from the first motor generator 71 is input to the first sun gear 41. The torque of the first motor generator 71 input to the first sun gear 41 is distributed to the planetary carrier 44 and the first ring gear 42. Then, when the torque of the first motor generator 71 is input to the crankshaft 14 via the planetary carrier 44, the crankshaft 14 is rotated. Rotating the crankshaft 14 by causing the first motor generator 71 to function as a motor in such a manner is referred to as motoring.

The torque of the engine 10 distributed to the ring gear 42 and the torque of the first motor generator 71 are input to the driven wheels 62 via the ring gear shaft 45, the transmission 90, and the differential 61.

When the hybrid vehicle is decelerated, causing the second motor generator 72 to function as a generator causes a regenerative braking force corresponding to the power generation amount of the second motor generator 72 to be produced in the hybrid vehicle. Causing the second motor generator 72 to function as a motor causes the output torque of the second motor generator 72 to be input to the driven wheels 62 via the ring gear shaft 45, the transmission 90, and the differential 61.

The power of the engine 10 is input to the transmission 90 via the power distribution-integration mechanism 40. Further, after an engine rotation speed Ne is changed by the transmission 90 and reduced by the differential 61, the power of the engine 10 is delivered to the driven wheels 62. A rotation speed Nr of the ring gear 42 is reduced at the deceleration ratio obtained by multiplying a deceleration ratio of the differential 61 and a gear ratio corresponding to the gear position provided in the transmission 90. The rotation speeds of the driven wheels 62 are reduced in such a manner.

Controlling the first motor generator 71 and the second motor generator 72 allows the rotation speed Nr of the ring gear 42 to be freely differentiated from the engine rotation speed Ne. That is, the deceleration ratio between the engine rotation speed Ne and the rotation speed Nr of the ring gear 42 can be changed continuously. Thus, in the hybrid vehicle, the total deceleration ratio (the ratio between the engine rotation speed Ne and the rotation speeds of the driven wheels 62) can be changed continuously.

In the hybrid vehicle, the engine rotation speed Ne is controlled through the motoring executed by the first motor generator 71. More specifically, in the same manner as when the deceleration ratio between the engine rotation speed Ne and the rotation speed Nr of the ring gear 42 is a fixed value, a gear-changing behavior like in a vehicle with a step transmission is achieved by changing the engine rotation speed Ne. That is, in the same manner as when the total deceleration ratio from the engine 10 to the driven wheels 62 is determined for each gear position, the engine rotation speed Ne can be changed in proportion with a vehicle speed SP.

Figure 2:
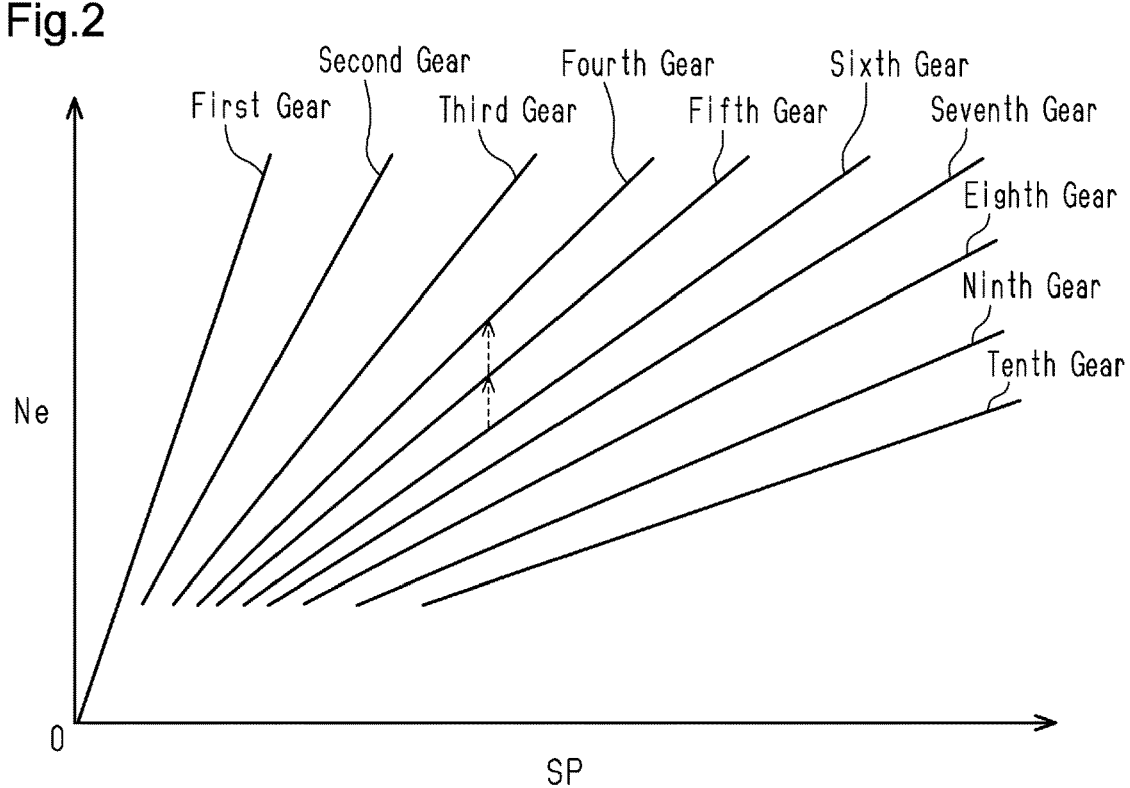
FIG. 2 is a graph showing the relationship between the vehicle speed of each virtual gear position and the engine rotation speed.

FIG. 2 shows ten virtual gear positions from first gear to tenth gear in the hybrid vehicle. The ten virtual gear positions are achieved by combining switching of four gear positions in the transmission 90 and switching of the deceleration ratio performed through the control of the engine rotation speed Ne by the first motor generator 71.

More specifically, the first motor generator 71 controls the engine rotation speed Ne to divide first gear of the transmission 90 into three virtual gear positions from first gear to third gear. Further, the first motor generator 71 controls the engine rotation speed Ne to divide second gear of the transmission 90 into three virtual gear positions from fourth gear to sixth gear. Furthermore, the first motor generator 71 controls the engine rotation speed Ne to divide third gear of the transmission 90 into three virtual gear positions from seventh gear to ninth gear. Then, fourth gear of the transmission 90 provides tenth gear in the virtual gear position.

As shown in FIG. 1, an intake passage 15 of the engine 10 is provided with a throttle valve 16, which adjusts the flow rate of intake air flowing through the intake passage 15. The exhaust gas produced through the combustion of air-fuel mixture in the combustion chamber of the engine 10 is discharged to an exhaust passage 21. The exhaust passage 21 includes a three-way catalyst 22. At the downstream side of the three-way catalyst 22 in the exhaust passage 21, a filter 23 is provided to trap particulate matter contained in exhaust gas. At the downstream side of the filter 23 in the exhaust passage 21, a downstream catalyst 24 is provided. The downstream catalyst 24 is similar to the three-way catalyst 22.

The engine 10 is controlled by an engine ECU 100. An air flow meter 81, which detects an intake air amount GA, a water temperature sensor 82, which detects a coolant temperature THW, which is the temperature of coolant in the internal combustion engine 10, and a crank angle sensor 85, which detects the rotation angle of the crankshaft 14, are connected to the engine ECU 100. The engine ECU 100 receives output signals from these sensors. Further, a first air-fuel ratio sensor 83 and a second air-fuel ratio sensor 84 are connected to the engine ECU 100. The first air-fuel ratio sensor 83 is arranged in the exhaust passage 21 on the upstream side of the three-way catalyst 22 to output a signal corresponding to the oxygen concentration of exhaust gas. The second air-fuel ratio sensor 84 is arranged in the exhaust passage 21 between the three-way catalyst 22 and the filter 23 to output a signal corresponding to the oxygen concentration of exhaust gas. The engine ECU 100 also receives output signals from these air-fuel ratio sensors. The signal output from the first air-fuel ratio sensor 83 is used to detect an upstream-side air-fuel ratio Afu, which is the air-fuel ratio of the exhaust gas on the upstream side of the three-way catalyst 22. Further, the signal output from the second air-fuel ratio sensor 84 is used to detect a downstream-side air-fuel ratio Afd, which is the air-fuel ratio of the exhaust gas on the downstream side of the three-way catalyst 22. A temperature sensor 89 is connected to the engine ECU 100. The temperature sensor 89 is arranged in the exhaust passage 21 between the three-way catalyst 22 and the filter 23 to detect a catalyst outgoing gas temperature THe, which is the temperature of exhaust gas subsequent to passing through the three-way catalyst 22.

The engine ECU 100 calculates the engine rotation speed Ne using an output signal Scr of the crank angle sensor 38. The engine ECU 100 uses the catalyst outgoing gas temperature THe and various engine running states, such as the intake air amount GA and the engine rotation speed Ne, to calculate a catalyst temperature Tsc, which is the temperature of the three-way catalyst 22, and a filter temperature Tf, which is the temperature of the filter 23. Further, the engine ECU 100 uses, for example, the engine rotation speed Ne, the intake air amount GA, and the filter temperature Tf to calculate a PM deposition amount Ps, which is the amount of particulate matter that deposits in the filter 23.

In addition to the engine ECU 100, which executes various types of control for the engine 10 as described above, the hybrid vehicle includes a motor ECU 300 and a hybrid ECU 200. The motor ECU 300 executes various types of control for the first motor generator 71 and the second motor generator 72. The hybrid ECU 200 centrally controls various ECUs, including the engine ECU 100 and the motor ECU 300. The hybrid ECU 200 is the controller for the hybrid vehicle.

The hybrid ECU 200 is a microprocessor including a CPU 200a. In addition to the CPU 200a, the hybrid ECU 200 includes a ROM 200b, which stores a program, and a RAM 200c, which temporarily stores data. In the hybrid ECU 200, the CPU 200a reads and executes the program stored in the ROM 200b, thereby executing various types of control. That is, in the hybrid ECU 200, the CPU 200a and the ROM 200b correspond to an execution device. An accelerator position sensor 86 and a brake position sensor 80 are connected to the hybrid ECU 200. The accelerator position sensor 86 detects an accelerator operation amount Acc, which is the amount of the accelerator pedal depressed by a driver. The brake position sensor 80 detects a brake position Bp, which is the depression amount of the brake pedal. Further, a vehicle speed sensor 87 and a power switch 88 are connected to the hybrid ECU 200. The vehicle speed sensor 87 detects the vehicle speed SP, which is the traveling speed of the hybrid vehicle. The hybrid ECU 200 receives output signals from these sensors and the switch. The power switch 88 is used to activate the system of the hybrid vehicle. When the power switch 88 is turned on, the hybrid vehicle enters a drivable state.

The hybrid vehicle also includes a battery ECU 400, which monitors the state of the battery 77, and a shift ECU 500, which controls the transmission 90. The engine ECU 100, the motor ECU 300, the battery ECU 400, and the shift ECU 500 are connected to the hybrid ECU 200 in a communicable manner.

The battery ECU 400, which serves as a battery controller, is connected to the battery 77. The battery ECU 400 monitors current IB in the battery 77, voltage VB in the battery 77, and a temperature TB of the battery 77. The battery ECU 400 uses the current IB, the voltage VB, and the temperature TB to calculate a state of charge SOC of the battery 77 and calculate an input upper limit value Win and an output upper limit value Wout of the battery 77.

More specifically, the battery ECU 400 calculates the state of charge SOC using an integration value of the current IB.

Further, the battery ECU 400 uses the calculated state of charge SOC and the temperature TB to calculate the input upper limit value Win, which is a maximum allowable electric power that can be charged to the battery 77, and the output upper limit value Wout, which is the maximum allowable electric power that can be discharged from the battery 77. The input upper limit value Win is represented by 0 or a negative value. As the absolute value of the input upper limit value Win increases, a larger amount of electric power is allowed to be charged to the battery 77. The output upper limit value Wout is represented by 0 or a positive value. As the absolute value of the output upper limit value Wout increases, a larger amount of electric power is allowed to be output from the battery 77.

In the hybrid vehicle, the electric power generated by one of the motor generators can be consumed by the other motor generator. Thus, the battery 77 is charged or discharged when the electric power generated by one of the motor generators is excessive or insufficient as compared to the electric power consumed by the other motor generator. If the electric power balance in the first motor generator 71 and the second motor generator 72 is in equilibrium, the battery 77 is not charged or discharged. The electric power balance in the first and second motor generators means the relationship between the electric power generated by one of the motor generators and the electric power consumed by the other motor generator. When the electric power balance in the first motor generator 71 and the second motor generator 72 is in equilibrium, it means that the electric power generated by one of the motor generators is substantially equal to the electric power consumed by the other motor generator. The electric power balance in the first and second motor generators 71, 72 affects the current IB, the voltage VB, and the temperature TB of the battery 77. Thus, the electric power balance in the first and second motor generators 71, 72 is also a parameter used to calculate the input upper limit value Win and the output upper limit value Wout.

The motor ECU 300 is connected to the first inverter 75 and the second inverter 76. The motor ECU 300 controls the amount of electric power supplied from the battery 77 to the first motor generator 71 and the second motor generator 72 and the amount of electric power supplied from the first motor generator 71 and the second motor generator 72 to the battery 77 (i.e., charge amount).

A selection device 95 is connected to the shift ECU 500. When operated by the driver, the selection device 95 outputs a signal requesting a change in the shift range. In the hybrid vehicle, when the selection device 95 is operated, a signal output from the selection device 95 is transmitted by the selection device 95 to the hybrid ECU 200. Further, the shift ECU 500 operates the transmission 90 using a signal output from the selection device 95 and a signal output from the hybrid ECU 200. Thus, the hybrid vehicle includes a shift-by-wire system that operates the transmission 90 by changing an operation input to the selection device 95 into an electrical signal and transmitting the electrical signal to the hybrid ECU 200.

Figure 3:
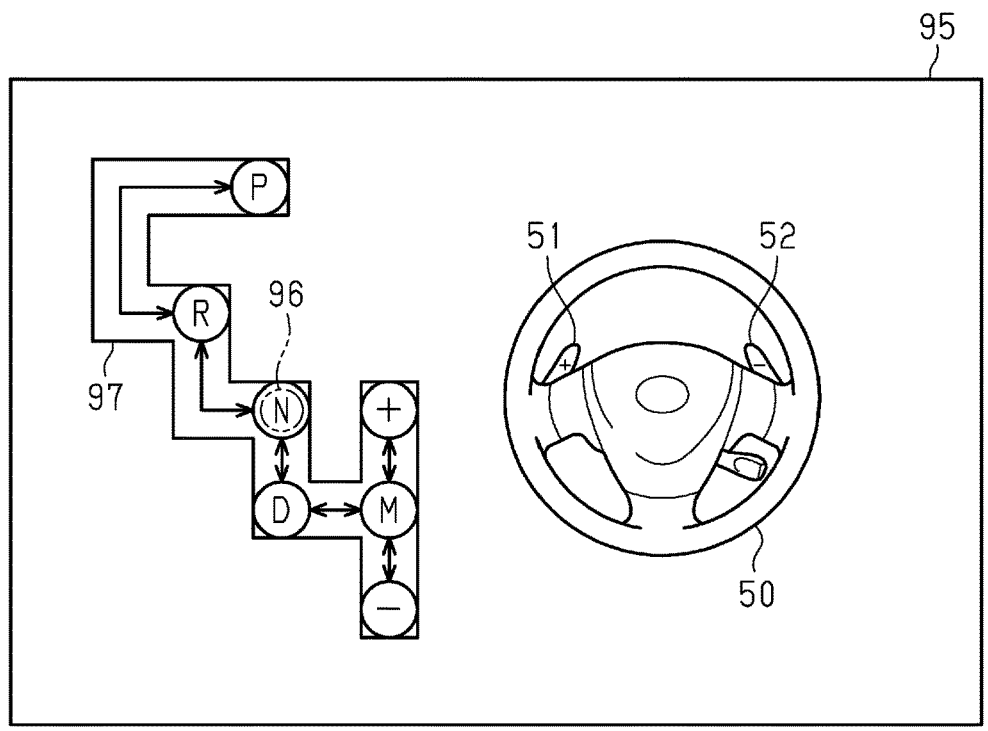
FIG. 3 is a diagram illustrating the selection device connected to the shift ECU.

As shown in FIG. 3, the selection device 95 includes a shift lever 96, which is operated by the driver, and an upshift paddle 51 and a downshift paddle 52, which are arranged at a steering wheel 50. The shift lever 96 is operated along a shift gate 97. Shift positions, to which different shift ranges are respectively allocated, are set for the shift gate 97.

More specifically, as shown in FIG. 3, a P-position corresponding to a parking range, a R-position corresponding to a reverse range, a N-position corresponding to a neutral range, a D-position corresponding to a drive range, and a M-position corresponding to a manual range are set for the shift gate 97. In FIG. 3, the broken line shows the shift lever 96 at the N-position.

The selection device 95 outputs, to the shift ECU 500, a signal corresponding to the position of the shift lever 96. When the shift lever 96 is operated to the D-position, the selection device 95 outputs, to the shift ECU 500, a request for changing the shift range to the drive range. The drive range is a shift range selected to advance the hybrid vehicle. When the shift range is the drive range, the hybrid ECU 200 controls the engine 10, the first motor generator 71, the second motor generator 72, and the transmission 90 such that the drive force acting in the advancing direction of the hybrid vehicle is transmitted to the driven wheels 62. When the shift range is the drive range, the hybrid ECU 200 sets the control mode of the hybrid vehicle to an automatic transmission mode. In the automatic transmission mode, a continuous speed-changing control that continuously changes the total deceleration ratio to control the engine 10, the first motor generator 71, the second motor generator 72, and the transmission 90 such that fuel and power are used with an optimal efficiency.

When the shift lever 96 is operated to the M-position, the selection device 95 outputs, to the shift ECU 500, a request for changing the shift range to the manual range. The manual range is a shift range selected to advance the hybrid vehicle. Thus, when the shift range is the manual range, the hybrid ECU 200 controls the engine 10, the first motor generator 71, the second motor generator 72, and the transmission 90 such that the drive force acting in the advancing direction of the hybrid vehicle to the driven wheels 62. When the shift range is the manual range, the hybrid ECU 200 sets the control mode of the hybrid vehicle to a manual transmission mode.

As shown in FIG. 3, a plus position and a minus position are arranged at the front part and the rear part of the M-position, respectively. The shift lever 96 is operated at the plus position to request upshifting. The shift lever 96 is operated at the minus position to request downshifting. The M-position is a neutral position located in the middle of the plus position and the minus position. When an operating force at the plus position or the minus position is released, the shift lever 96 returns to the M-position.

When the shift lever 96 is operated from the M-position to the plus position or the minus position, the virtual gear position is upshifted or downshifted by the hybrid ECU 200. More specifically, every time the shift lever 96 is operated to the plus position, the virtual gear position is upshifted by one. Every time the shift lever 96 is operated to the minus position, the virtual gear position is downshifted by one.

As shown in FIG. 3, the steering wheel 50 includes the upshift paddle 51 and the downshift paddle 52. In the hybrid vehicle, the upshift paddle 51 and the downshift paddle 52 are also part of the selection device 95. Thus, the virtual gear position can also be changed by operating the upshift paddle 51 or the downshift paddle 52. More specifically, when the control mode is set to the manual transmission mode by operating the shift lever 96 to the M-position, the virtual gear position is upshifted by one every time the upshift paddle 51 is pulled. The virtual gear position is downshifted by one every time the downshift paddle 52 is pulled.

Thus, in the manual transmission mode, the virtual gear position is changed by the driver performing a changing operation for the virtual gear position. That is, in the manual transmission mode, the total deceleration ratio corresponding to the selected virtual gear position is maintained. Further, referring to FIG. 2, a gear position fixing control is executed to change the engine rotation speed Ne in correspondence with the vehicle speed SP at a change rate that corresponds to the virtual gear position. That is, the CPU 200a of the hybrid ECU 200 executes the gear position fixing control in the manual transmission mode.

The virtual gear position is changed by the hybrid ECU 200 in reference to a command of changing the virtual gear position from the hybrid ECU 200. In the hybrid vehicle, as described above, four gear positions in the transmission 90 are divided into ten virtual gear positions by the control of the first motor generator 71. Thus, when the virtual gear position is changed, the gear position may also be shifted by the shift ECU 500 operating the transmission 90.

When the shift lever 96 is operated to the R-position, the selection device 95 outputs, to the shift ECU 500, a request for changing the shift range to the reverse range. The reverse range is a shift range in which the drive force generated by the engine 10 is transmitted to the driven wheels 62 as the drive force acting in a direction in which the hybrid vehicle is moved backwards. When the shift range is the reverse range, the hybrid ECU 200 controls the second motor generator 72 and the transmission 90 such that the drive force acting in the backward-movement direction of the hybrid vehicle is transmitted to the driven wheels 62. As a result, the torque of the second motor generator 72 causes the hybrid vehicle to move backwards.

When the shift lever 96 is operated to the N-position, the selection device 95 outputs, to the shift ECU 500, a request for changing the shift range to the neutral range. The neutral range is a shift range selected to tow the hybrid vehicle or cause the hybrid vehicle to coast. The neutral range is a shift range for blocking the transmission of drive force between the engine 10 and the driven wheels 62. When the shift range is the neutral range, the hybrid ECU 200 controls the transmission 90 via the shift ECU 500 such that the drive force generated by the engine 10 is not transmitted to the driven wheels 62. More specifically, the shift ECU 500 outputs a command to the transmission 90 to disengage all the engagement devices of the transmission 90 and block the transmission of the drive force by the transmission 90 such that the drive force of the engine 10 is not transmitted to the driven wheels 62. That is, the neutral range is a non-driven range that prevents the drive force of the engine 10 from being transmitted to the driven wheels 62.

When the shift lever 96 is operated to the P-position, the selection device 95 outputs, to the shift ECU 500, a request for changing the shift range to the parking range. The parking range is a shift range selected to keep the hybrid vehicle stopped after parking the hybrid vehicle. When the shift range is the parking range, in the same manner as the neutral range, the hybrid ECU 200 disengages all the engagement devices of the transmission 90 and block the transmission of the drive force by the transmission 90. Further, in the parking range, the hybrid ECU 200 activates a parking lock that restricts the rotation of the output shaft of the transmission 90, thereby keeping the hybrid vehicle stopped.

As described above, the engine ECU 100, the motor ECU 300, the battery ECU 400, and the shift ECU 500 are connected to the hybrid ECU 200 in a communicable manner. The hybrid ECU 200 receives, from the shift ECU 500, the information related to the selected virtual gear position and the gear position in the transmission 90. The hybrid ECU 200 receives, from the battery ECU 400, the state of charge SOC, the input upper limit value Win, and the output upper limit value Wout of the battery 77. The engine ECU 100 controls the engine 10 with a control signal from the hybrid ECU 200 and transmits, to the hybrid ECU 200, signals of various sensors and data indicating the running state of the engine 10.

The hybrid ECU 200 uses the accelerator operation amount Acc and the vehicle speed SP to calculate a requested drive force, which is requested for the hybrid vehicle. The hybrid ECU 200 uses the state of charge SOC to calculate the total power in view of the power needed to generate electric power. Using the total power, the hybrid ECU 200 controls the engine 10, the first motor generator 71, and the second motor generator 72 so as to achieve the requested drive force and achieve a charge request power. In order to prevent the battery 77 from degrading, the CPU 200a of the hybrid ECU 200 controls the first motor generator 71 and the second motor generator 72 in a range in which the input and output of the battery 77 are not greater than the input upper limit value Win and the output upper limit value Wout.

The CPU 200a controls the engine 10 and the first motor generator 71 such that the engine rotation speed Ne becomes close to a target engine rotation speed, which is set using the requested drive force. Further, the CPU 200a controls the second motor generator 72 such that the requested drive force is achieved by the power transmitted from the ring gear 42 of the power distribution-integration mechanism 40 to the driven wheels 62.

In the engine 10, when the accelerator operation is deactivated, the requested drive force may be a negative value and the combustion of air-fuel mixture in the cylinders may be stopped during the rotation of the crankshaft 14. The period during which the combustion of air-fuel mixture in the cylinders is stopped during the rotation of the crankshaft 14 is referred to as a combustion stopped period. In contrast to the combustion stopped period, in which the combustion of air-fuel mixture in the cylinders is stopped, the period during which air-fuel mixture is burned in the cylinders is referred to as a combustion operating period.

When the shift range is the drive range and the requested drive force is a negative value due to the deactivation of the accelerator operation, the hybrid ECU 200 causes the second motor generator 72 to perform regenerative braking in a state in which the combustion operation of the engine 10 is stopped. In this case, a rotation speed Nm1 of the first motor generator 71 and the engine rotation speed Ne are zero, and a braking torque is produced by the second motor generator 72 generating electric power. The hybrid ECU 200 controls the second motor generator 72 via the motor ECU 300 so as to produce a braking force corresponding to the requested drive force.

As described above, when the shift range is the manual range, the hybrid ECU 200 controls the first motor generator 71 such that the engine rotation speed Ne changes in correspondence with the vehicle speed SP. Thus, the hybrid ECU 200 drives the crankshaft 14 using the first motor generator 71 via the motor ECU 300, thereby executing motoring. To rotate the crankshaft 14 of the engine 10 in which the combustion operation is not performed, the crankshaft 14 needs to be rotated against the friction of the engine 10. Executing the motoring causes the torque generated by the friction of the engine 10 to act on the ring gear shaft 45. Then, the torque generated by the friction produces a braking force in the ring gear shaft 45. That is, when motoring is executed, engine braking is operated. Changing the virtual gear position changes the magnitude of the braking force produced by the engine braking.

That is, as shown by the broken arrows in FIG. 2, the engine rotation speed Ne at the same vehicle speed SP is higher in sixth gear than in fifth gear, and is higher in fifth gear than in fourth gear. In other words, as the virtual gear position decreases, the engine rotation speed Ne increases. Thus, as the selected virtual gear position decreases, the engine rotation speed Ne increases, thereby increasing the torque generated by the friction and increasing the braking force produced by engine braking.

Figure 4:
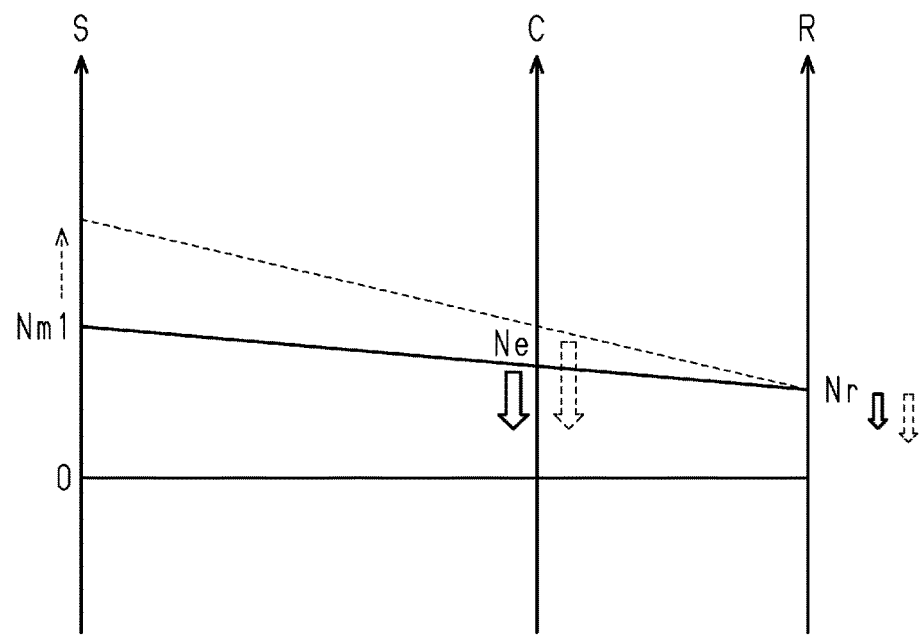
FIG. 4 is a nomogram illustrating the engine braking in the hybrid vehicle.

FIG. 4 is a nomogram showing the relationship between the rotation speeds in each rotation element of the power distribution-integration mechanism 40 when engine braking is operated in this manner. In FIG. 4, the S-axis on the left side represents the rotation speed of the sun gear 41 (the rotation speed Nm1 of the first motor generator 71), the C-axis represents the rotation speed of the planetary carrier 44 (the engine rotation speed Ne), and the R-axis represents a rotation speed Nm2 of the second motor generator 72 (the rotation speed Nr of the ring gear 42).

As shown by the blank down arrow on the C-axis in FIG. 4, when motoring is performed so that the crankshaft 14 is rotated by the first motor generator 71, a negative torque produced by the friction of the engine 10 acts on the crankshaft 14. As shown by the blank down arrow on the R-axis in FIG. 4, the torque produced by the friction causes a negative torque to act on the ring gear shaft 45. Since the ring gear shaft 45 is connected to the driven wheels 62 via the transmission 90 and the differential 61, the negative torque acting on the ring gear shaft 45 acts on the driven wheels 62 as the braking force produced by engine braking.

If the virtual gear position is changed to a lower one, the rotation speed Nm1 of the first motor generator 71 increases until the engine rotation speed Ne becomes a value corresponding to the changed virtual gear position as shown by the broken arrow in FIG. 4. Consequently, the engine rotation speed Ne increases as shown by the broken line in FIG. 4, and the magnitude of the torque produced by the friction of the engine 10 increases as shown by the blank down arrow on the C-axis. This increases the magnitude of the negative torque acting on the ring gear shaft 45 as shown by the blank broken arrow on the R-axis, thereby increasing the braking force produced by engine braking. Thus, in the manual range, the magnitude of the braking force during fuel cut-off produced by deactivating the accelerator operation can be selectively changed by changing the virtual gear position.

During the combustion stopped period, the piston in each cylinder of the engine 10 reciprocates in synchronization with the rotation of the crankshaft 14. Thus, the air drawn into each cylinder through the intake passage 15 is discharged to the exhaust passage 21 without being burned.

During the combustion stopped period, in addition to fuel cut-off that stops fuel injection, a fuel drawing process may be executed to inject fuel, discharge the fuel out of each cylinder without burning the fuel, and draw the fuel into the three-way catalyst 22.

When the fuel drawing process is executed, the fuel flows through the exhaust passage 21 with air and is then drawn into the three-way catalyst 22. If the temperature of the three-way catalyst 22 is greater than or equal to an activation temperature and a sufficient amount of oxygen is present in the three-way catalyst 22 to burn the fuel, the fuel burns in the three-way catalyst 22. When the fuel burns in the three-way catalyst 22, the temperature of the three-way catalyst 22 increases so that high-temperature gas flows into the filter 23, thereby increasing the temperature of the filter 23. When the temperature of the filter 23 becomes greater than or equal to the temperature of the ignition point of particulate matter in a state in which oxygen is supplied to the filter 23, the particulate matter trapped by the filter 23 is burned and eliminated, thereby regenerating the filter 23.

Thus, during the execution of a filter regeneration process that regenerates the filter 23, the hybrid ECU 200 executes motoring with the throttle valve 16 open during fuel cut-off such that oxygen continues to be supplied to the filter 23 even during the fuel cut-off. Continuing to supply oxygen in this manner causes particulate matter to continue to burn even during the fuel cut-off and quickly completes the filter regeneration.

Figure 5:
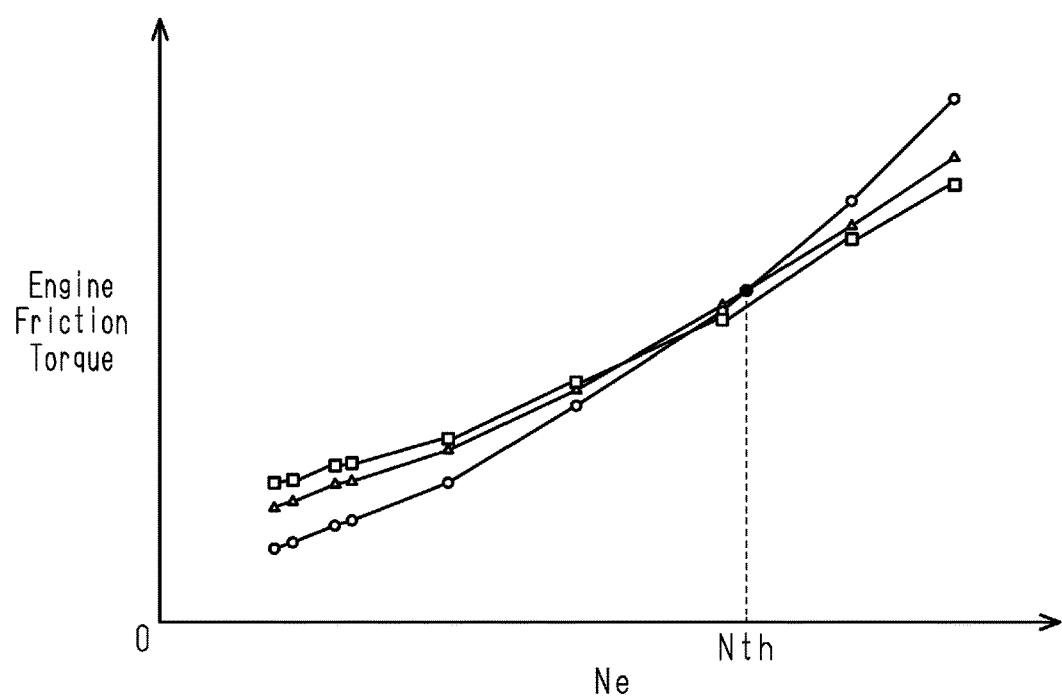
FIG. 5 is a graph showing the relationship between the engine rotation speed and the engine friction torque.

Opening the throttle valve 16 during motoring changes the magnitude of a negative torque produced by the friction of the engine 10. In the hybrid vehicle, the friction of the engine 10 produces a negative torque in a state in which motoring is performed. FIG. 5 shows the relationship between the magnitude of such a negative torque and the engine rotation speed Ne. The relationship was obtained through the result of an experiment where measurement was conducted with a changed throttle open degree. In the following description, the torque acting on the crankshaft 14 by the friction of the engine 10 is referred to as an engine friction torque, and the braking torque acting on the ring gear shaft 45 by the engine friction torque is referred to as an engine braking torque.

In FIG. 5, the rectangular symbols indicate the result of the measurement conducted with the throttle valve 16 closed. The triangular symbols indicate the result of measurement conducted in a state in which the throttle valve 16 is opened unintentionally as a result of the flow of intake air produced by motoring instead of driving the throttle valve 16 (i.e., the same state as when engine braking is operated in the manual range). The circular symbols indicate the result of measurement conducted with the throttle valve 16 fully open. FIG. 5 shows the absolute value of the engine friction torque, which is a negative value. That is, the engine friction torque increases as the positions of the symbols become higher in FIG. 5.

As shown in FIG. 5, all the measurement results show that the absolute value of the engine braking torque (i.e., the magnitude of the engine braking torque) increases as the engine rotation speed Ne increases. However, as shown in FIG. 5, the solid line connecting the triangular symbols showing the result of the case where the throttle valve 16 opens unintentionally and the solid line connecting the circular symbols showing the result of the case where the throttle valve 16 is fully open intersect with each other at a certain point. This indicates that the direction in which the engine friction torque changes when the throttle valve 16 is opened reverses at a predetermined rotation speed Nth, which is a value of the engine rotation speed Ne at the intersection point of the solid lines.

More specifically, in FIG. 5, when the engine rotation speed Ne is less than the predetermined rotation speed Nth, the solid line connecting the triangular symbols showing the result of the case where the throttle valve 16 opens unintentionally is located above the solid line connecting the circular symbols showing the result of the case where the throttle valve 16 is fully open. That is, the graph in FIG. 5 shows that when the engine rotation speed Ne is less than the predetermined rotation speed Nth, the engine friction torque is decreased by opening the throttle valve 16.

In FIG. 5, when the engine rotation speed Ne is greater than the predetermined rotation speed Nth, the solid line connecting the triangular symbols showing the result of the case where the throttle valve 16 opens unintentionally is located below the solid line connecting the circular symbols showing the result of the case where the throttle valve 16 is fully open. That is, the graph in FIG. 5 shows that when the engine rotation speed Ne is greater than the predetermined rotation speed Nth, the engine friction torque is increased by opening the throttle valve 16.

When the execution of the filter regeneration process is requested as described above, the opening of the throttle valve 16 may be requested during motoring to issue an increase request for the throttle open degree. Changes in the braking force due to such an increase request for the throttle open degree need to be limited when the braking force produced by the engine friction torque are applied to the driven wheels 62 by manipulating the engine rotation speed Ne so as to obtain the total deceleration ratio corresponding to the virtual gear position selected by the driver with the manual range selected. That is, such an increase request for the throttle open degree is not based on the operation for requesting a change in the braking force performed by the driver, such as a changing operation for the virtual gear position, an accelerator operation, or a braking operation that is performed by the driver. Thus, when the braking force changes according to such an increase request for the throttle open degree, the driver feels annoyed.

To limit such a change in the braking force, the CPU 200a of the hybrid ECU 200 operates the first motor generator 71 to limit a change in the engine rotation speed Ne caused by a change in the engine friction torque, and increases or decreases the regenerative braking torque by the second motor generator 72 to limit a change in the braking force.

Figure 6:
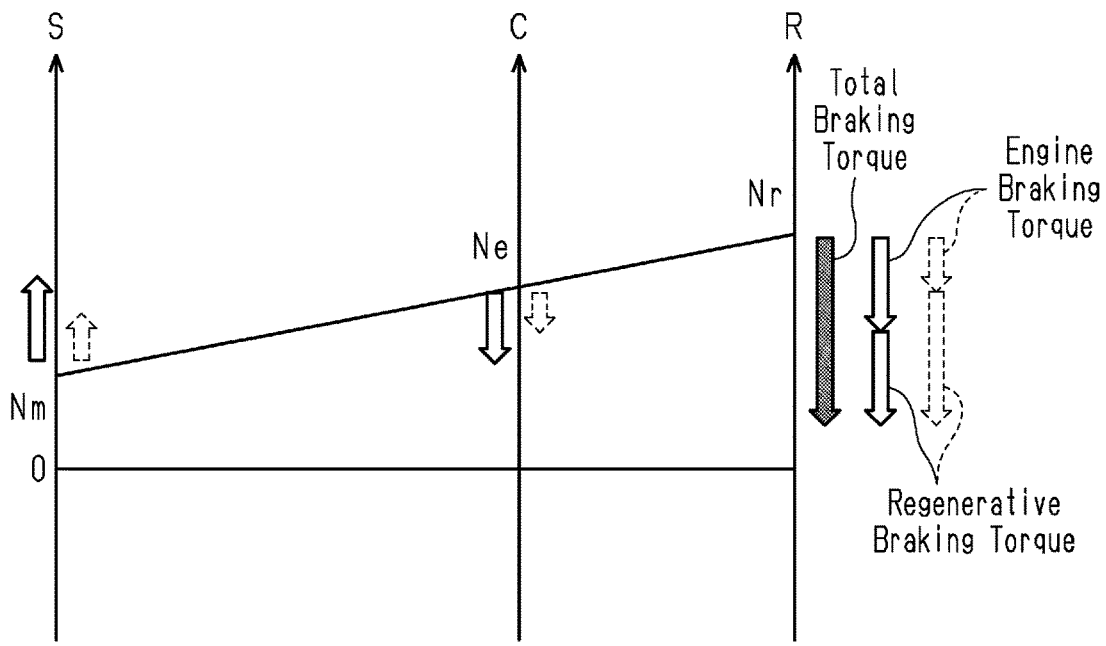
FIG. 6 is a nomogram illustrating an increase in the charge amount when the throttle open degree is increased during a low-speed rotation.
Figure 7:
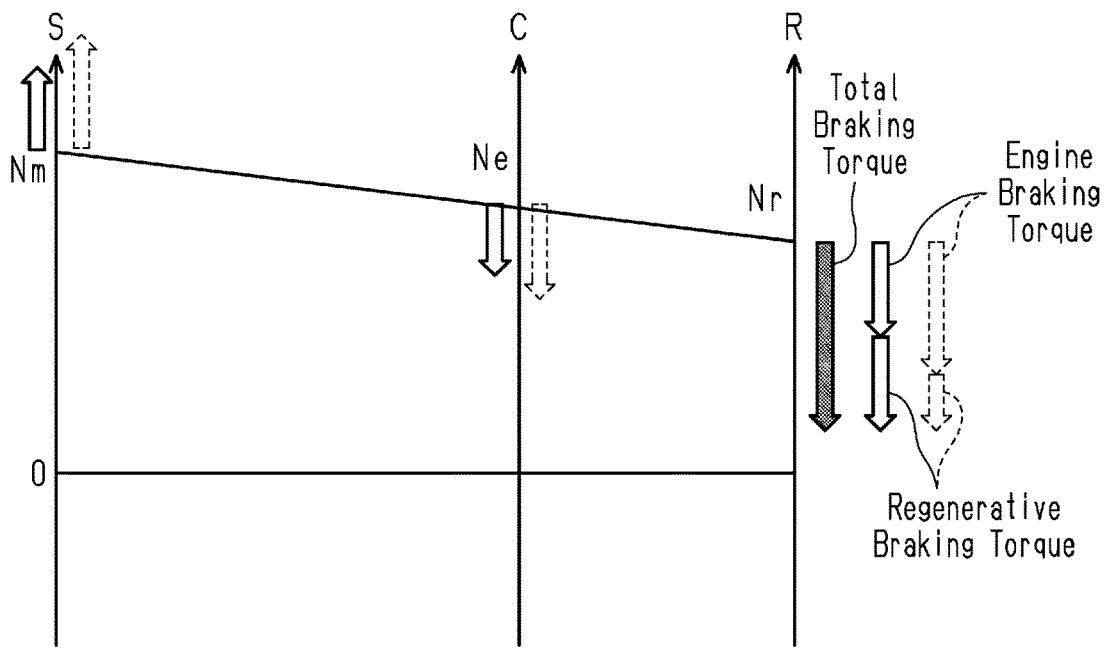
FIG. 7 is a nomogram illustrating an increase in the discharge amount when the throttle open degree is increased during a high-speed rotation.

With reference to FIGS. 6 and 7, the control to limit a change in the braking force will now be described in detail. FIG. 6 is a nomogram illustrating the control performed when the engine rotation speed Ne is lower than the predetermined rotation speed Nth and the engine friction torque decreases as the throttle valve 16 opens. FIG. 7 is a nomogram illustrating the control performed when the engine rotation speed Ne is higher than the predetermined rotation speed Nth and the engine friction torque increases as the throttle valve 16 opens.

In each of FIGS. 6 and 7, the shaded down arrow in the R-axis represents a total braking torque acting on the ring gear shaft 45. The total braking torque is the sum of the engine braking torque acting on the ring gear shaft 45 and the regenerative braking torque produced by the second motor generator 72. In FIGS. 6 and 7, the torque produced before the opening of the throttle valve 16 is shown by the blank solid arrow and the torque produced after the opening of the throttle valve 16 is shown by the blank broken arrow.

As shown in FIG. 6, in the case where the engine rotation speed Ne is low, the engine friction torque decreases as shown in the C-axis when the throttle valve 16 opens. To limit a change in the engine rotation speed Ne, the CPU 200a of the hybrid ECU 200 outputs, to the motor ECU 300, a signal that decreases a positive torque (i.e., driving torque) in the first motor generator 71 by an amount corresponding to a decrease in the engine friction torque as shown in the S-axis. Further, when the engine friction torque decreases, the engine braking torque decreases as shown in the R-axis. Thus, the CPU 200a of the hybrid ECU 200 outputs, to the motor ECU 300, a signal that increases a negative torque (i.e., regenerative braking torque) in the second motor generator 72 by an amount corresponding to a decrease in the engine braking torque.

As shown in FIG. 7, in the case where the engine rotation speed Ne is high, the engine friction torque increases as shown in the C-axis when the throttle valve 16 opens. To limit a change in the engine rotation speed Ne, the CPU 200a of the hybrid ECU 200 outputs, to the motor ECU 300, a signal that increases the driving torque in the first motor generator 71 by an amount corresponding to an increase in the engine friction torque as shown in the S-axis. Further, when the engine friction torque increases, the engine braking torque increases as shown in the R-axis. Thus, the CPU 200a of the hybrid ECU 200 outputs, to the motor ECU 300, a signal that decreases the regenerative braking torque in the second motor generator 72 by an amount corresponding to an increase in the engine braking torque.

The first motor generator 71 and the second motor generator 72 are controlled as described above. In this control, limiting changes in the engine rotation speed Ne and the braking force changes the electric power balance in the first and second motor generators 71, 72 and changes the manner of the input and output of electric power in the battery 77.

More specifically, as shown in FIG. 6, when the engine friction torque decreases, the positive torque in the first motor generator 71 is increased whereas the negative torque in the second motor generator 72 is decreased. Thus, the input and output of electric power in the battery 77 change such that the output from the battery 77 increases and the input to the battery 77 decreases.

In contrast, as shown in FIG. 7, when the engine friction torque increases, the positive torque in the first motor generator 71 is decreased whereas the negative torque in the second motor generator 72 is increased. Thus, the input and output of electric power in the battery 77 change such that the output from the battery 77 decreases and the input to the battery 77 increases.

As described above, the CPU 200a of the hybrid ECU 200 controls the first motor generator 71 and the second motor generator 72 in the range in which the input and output of the battery 77 are not greater than the input upper limit value Win and the output upper limit value Wout. Accordingly, in some magnitudes of the input upper limit value Win and the output upper limit value Wout, changes in the engine rotation speed Ne and the braking force may not be able to be limited by controlling the first motor generator 71 and the second motor generator 72 as described with reference to FIGS. 6 and 7.

Thus, in the hybrid ECU 200, in a case where the increase request for the throttle open degree is issued when motoring is executed to operate engine braking, a valve-opening limitation process is executed to limit an increase in the throttle open degree in correspondence with the magnitudes of the input upper limit value Win and the output upper limit value Wout.

Figure 8:
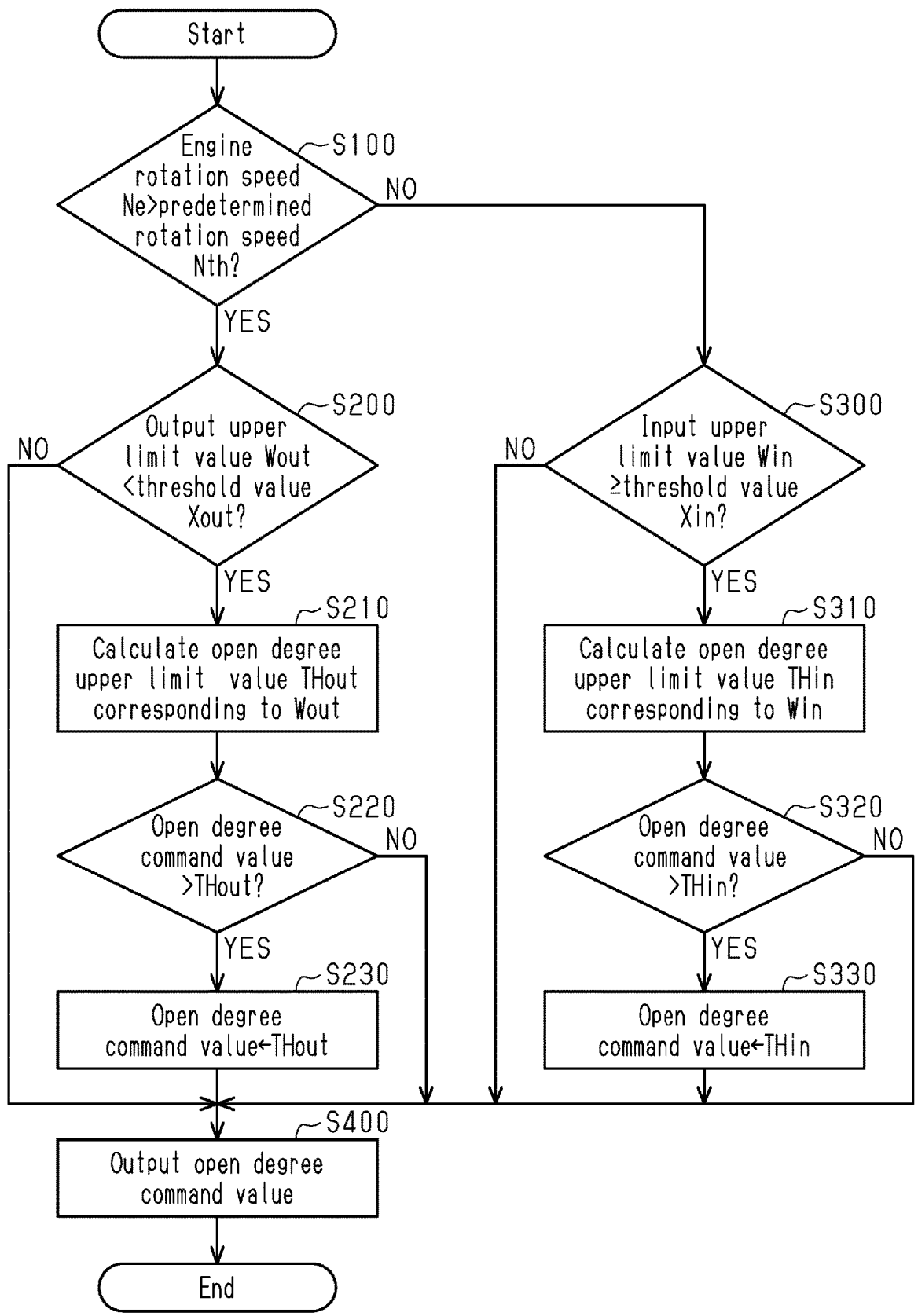
FIG. 8 is a flowchart illustrating a series of processes executed when an increase request for the throttle open degree is issued in a state in which the engine braking is operated by executing motoring.

With reference to FIG. 8, the valve-opening limitation process will now be described. FIG. 8 is a flowchart illustrating a series of processes in a routine for the valve-opening limitation process.

The routine is executed by the CPU 200a of the hybrid ECU 200 upon issuance of the increase request for the throttle open degree that is not based on the operation of requesting a change in the braking force performed by the driver in a state where the shift range is the manual range and the engine braking torque is generated by motoring.

As shown in FIG. 8, when starting the routine, the CPU 200a first determines whether the engine rotation speed Ne is greater than the predetermined rotation speed Nth in the process of step S100. When determining that the engine rotation speed Ne is greater than the predetermined rotation speed Nth in step S100 (step S100: YES), the CPU 200a advances the process to step S200.

The CPU 200a determines whether the output upper limit value Wout is less than a threshold value Xout in the process of step S200. The threshold value Xout is used to determine whether the valve-opening limitation process needs to be executed. The threshold value Xout is set, using the result of an experiment conducted in advance, to a magnitude that allows for the determination that the output from the battery 77 does not exceed the output upper limit value Wout even if the valve-opening limitation process is not executed when the output upper limit value Wout is greater than or equal to the threshold value Xout.

When determining that the output upper limit value Wout is less than the threshold value Xout in the process of step S200 (step S200: YES), the CPU 200a advances the process to step S210. In the process of S210, the CPU 200a calculates an open degree upper limit value THout corresponding to the output upper limit value Wout. The open degree upper limit value THout is the upper limit value of the throttle open degree set such that the output from the battery 77 does not exceed the output upper limit value Wout. In reference to a calculation map stored in the ROM 200b, the CPU 200a uses the output upper limit value Wout and the engine rotation speed Ne to calculate the open degree upper limit value THout. The calculation map is created from the result of an experiment conducted in advance.

The open degree upper limit value THout calculated in reference to the calculation map decreases as the output upper limit value Wout decreases. Further, the open degree upper limit value THout calculated in reference to the calculation map decreases as the engine rotation speed Ne increases. The open degree upper limit value THout decreases as the engine rotation speed Ne increases in this manner because the amount of the engine friction torque increased by the opening of the throttle valve 16 becomes larger as the engine rotation speed Ne increases in the case where the engine rotation speed Ne is greater than the predetermined rotation speed Nth as shown in FIG. 5.

When calculating the open degree upper limit value THout in step S210, the CPU 200a advances the process to step S220. In the process of step S220, the CPU 200a determines whether an open degree command value, which is a command value of the open degree of the throttle valve 16, is greater than the open degree upper limit value THout.

When determining that the open degree command value is greater than the open degree upper limit value THout in the step S220 (step S220: YES), the CPU 200a advances the process to step S230. In the process of step S230, the CPU 200a updates the open degree command value to a value equivalent to the open degree upper limit value THout. Then, the CPU 200a advances the process to step S400. In the process of step S400, the CPU 200a outputs the open degree command value to the engine ECU 100. When determining that the open degree command value is less than or equal to the open degree upper limit value THout in the process of step S220 (step S220: NO), the CPU 200a advances the process to step S400 without executing the process of step S230. When outputting the open degree command value in this manner, the CPU 200a ends the routine.

After receiving the open degree command value output from the hybrid ECU 200, the engine ECU 100 changes the throttle open degree in correspondence with the open degree command value. That is, the processes from step S210 to step S230 correspond to a second valve-opening limitation process that limits an increase in the throttle open degree by setting the open degree upper limit value THout calculated in correspondence with the output upper limit value Wout and the engine rotation speed Ne and by implementing an upper limit guard such that the open degree command value does not exceed the open degree upper limit value THout.

Thus, the hybrid ECU 200 executes the second valve-opening limitation process, as the valve-opening limitation process, to limit an increase in the throttle open degree using the open degree upper limit value THout calculated in correspondence with the output upper limit value Wout when the engine rotation speed Ne is greater than the predetermined rotation speed Nth. When determining that the output upper limit value Wout is greater than or equal to the threshold value Xout in the process of step S200 (step S200: NO), the valve-opening limitation process does not need to be executed. In this case, the CPU 200a thus advances the process to step S400 to output the open degree command value without executing the processes from step S210 to step S230.

When determining that the engine rotation speed Ne is less than or equal to the predetermined rotation speed Nth in step S100 (step S100: NO), that is, when the engine friction torque decreases as the throttle open degree increases, the CPU 200a advances the process to step S300.

The CPU 200a determines whether the input upper limit value Win is greater than or equal to a threshold value Xin in the process of step S300. The input upper limit value Win and the threshold value Xin are both negative values. Thus, when the input upper limit value Win is greater than or equal to the threshold value Xin, the magnitude of the input to the battery 77 does not exceed the magnitude of the input specified by the threshold value Xin. The threshold value Xin is used to determine whether the valve-opening limitation process needs to be executed. The threshold value Xin is set, using the result of an experiment conducted in advance, to a magnitude that allows for the determination that the magnitude of the input to the battery 77 does not exceed the input upper limit value Win even if the valve-opening limitation process is not executed when the input upper limit value Win is less than the threshold value Xin.

When determining that the input upper limit value Win is greater than or equal to the threshold value Xin in the process of step S300 (step S300: YES), the CPU 200a advances the process to step S310. In the process of S310, the CPU 200a calculates an open degree upper limit value THin corresponding to the input upper limit value Win. The open degree upper limit value THin is the upper limit value of the throttle open degree set such that the magnitude of the input to the battery 77 does not exceed the input upper limit value Win. In reference to a calculation map stored in the ROM 200b, the CPU 200a uses the input upper limit value Win and the engine rotation speed Ne to calculate the open degree upper limit value THin. The calculation map is created from the result of an experiment conducted in advance.

The open degree upper limit value THin calculated in reference to the calculation map decreases as the input upper limit value Win increases (i.e., as the absolute value of the input upper limit value Win decreases and the magnitude of an allowable input decreases). Further, the open degree upper limit value THin calculated in reference to the calculation map decreases as the engine rotation speed Ne decreases. The open degree upper limit value THin decreases as the engine rotation speed Ne decreases in this manner because the amount of the engine friction torque decreased by the opening of the throttle valve 16 becomes larger as the engine rotation speed Ne decreases in the case where the engine rotation speed Ne is less than the predetermined rotation speed Nth as shown in FIG. 5.

When calculating the open degree upper limit value THin in step S310, the CPU 200a advances the process to step S320. In the process of step S320, the CPU 200a determines whether the open degree command value, which is a command value of the open degree of the throttle valve 16, is greater than the open degree upper limit value THin.

When determining that the open degree command value is greater than the open degree upper limit value THout in the step S320 (step S320: YES), the CPU 200a advances the process to step S330. In the process of step S330, the CPU 200a updates the open degree command value to a value equivalent to the open degree upper limit value THin. Then, the CPU 200a advances the process to step S400.

When determining that the open degree command value is less than or equal to the open degree upper limit value THin in the process of step S320 (step S320: NO), the CPU 200a advances the process to step S400 without executing the process of step S330. When outputting the open degree command value in this manner, the CPU 200a ends the routine.

After receiving the open degree command value output from the hybrid ECU 200, the engine ECU 100 changes the throttle open degree in correspondence with the open degree command value. That is, the processes from step S310 to step S330 correspond to a first valve-opening limitation process that limits an increase in the throttle open degree by setting the open degree upper limit value THin calculated in correspondence with the input upper limit value Win and the engine rotation speed Ne and by implementing an upper limit guard such that the open degree command value does not exceed the open degree upper limit value THout.

Thus, the hybrid ECU 200 executes the first valve-opening limitation process, as the valve-opening limitation process, to limit an increase in the throttle open degree using the open degree upper limit value THin calculated in correspondence with the input upper limit value Win when the engine rotation speed Ne is less than or equal to the predetermined rotation speed Nth. When determining that the input upper limit value Win is less than the threshold value Xin in the process of step S300 (step S300: NO), the valve-opening limitation process does not need to be executed. In this case, the CPU 200a thus advances the process to step S400 to output the open degree command value without executing the processes from step S310 to step S330.

The operation of the present embodiment will now be described.

An increase in the throttle open degree decreases the flow resistance of air in the intake passage 15. Thus, when the engine rotation speed Ne is low, an increase in the throttle open degree during motoring decreases the friction of the engine 10. When an increase in the throttle open degree decreases the friction of the engine 10, the friction of the engine 10 produces a smaller braking force. Thus, in order to maintain the braking force, the regenerative braking force produced by the second motor generator 72 needs to be increased. In this case, the electric power input to the battery 77 increases. Accordingly, in order to prevent overcharging, the increase in the throttle open degree simply needs to be limited such that the input electric power does not exceed the input upper limit value Win.

In the engine ECU 100, when the engine rotation speed Ne is less than or equal to the predetermined rotation speed Nth, the first valve-opening limitation process is executed to limit the throttle open degree in correspondence with the input upper limit value Win.

In the engine 10, when the engine rotation speed Ne becomes greater than the predetermined rotation speed Nth, the direction in which the friction of the engine 10 changes due to an increase in the throttle open degree is reversed. When the engine rotation speed Ne is greater than the predetermined rotation speed Nth, an increase in the throttle open degree increases the friction of the engine 10.

Thus, in the engine ECU 100, when the engine rotation speed Ne is greater than the predetermined rotation speed Nth, the second valve-opening limitation process is executed to limit an increase in the throttle open degree in correspondence with the output upper limit value Wout. That is, when an increase in the throttle open degree increases the friction of the engine 10, the regenerative braking force produced by the second motor generator 72 needs to be decreased. In this case, the electric power output from the braking force is likely to increase. Thus, in order to prevent overdischarging, the increase in the throttle open degree simply needs to be limited such that the output electric power does not exceed the output upper limit value Wout.

Thus, in the engine ECU 100, when the engine rotation speed Ne is greater than the predetermined rotation speed Nth, the throttle open degree is limited in correspondence with the output upper limit value Wout.

The advantages of the embodiment will now be described.

(1) The first valve-opening limitation process prevents the occurrence of overcharging resulting from an increase in the throttle open degree.

(2) Further, the second valve-opening limitation process prevents the occurrence of overdischarging resulting from an increase in the throttle open degree.

(3) The magnitude of a change in the friction of the engine 10 resulting from a change in the throttle open degree is different depending on the engine rotation speed Ne. In the above-described configuration, the first valve-opening limitation process is executed to limit the throttle open degree in correspondence with the engine rotation speed Ne and the input upper limit value Win. The engine rotation speed Ne correlates with the magnitude of a change in the friction of the engine 10. The engine rotation speed Ne also correlates with the amount of the input electric power that increases as the throttle open degree becomes larger. Accordingly, overcharging caused when the throttle open degree becomes greater than the open degree upper limit value THin is prevented by setting the open degree upper limit value THin, which is the upper limit value of the throttle open degree, in correspondence with the input upper limit value Win and the engine rotation speed Ne and limiting the throttle open degree such that the throttle open degree is in the range less than or equal to the open degree upper limit value THin.

(4) In the above-described configuration, the second valve-opening limitation process is executed to limit the throttle open degree in correspondence with the engine rotation speed Ne and the output upper limit value Wout. Accordingly, overdischarging caused when the throttle open degree becomes greater than the open degree upper limit value THout is prevented by setting the open degree upper limit value THout, which is the upper limit value of the throttle open degree, in correspondence with the output upper limit value Wout and the engine rotation speed Ne and limiting the throttle open degree such that the throttle open degree is in the range less than or equal to the open degree upper limit value THout.

The present embodiment may be modified as follows. The present embodiment and the following modifications can be combined as long as they remain technically consistent with each other.

In the above-described embodiment, the open degree upper limit value THout is calculated in correspondence with the output upper limit value Wout and the engine rotation speed Ne, and the open degree upper limit value THin is calculated in correspondence with the input upper limit value Win and the engine rotation speed Ne. The open degree upper limit values do not have to be calculated in this manner. For example, instead of calculating the open degree upper limit value THout in correspondence with the output upper limit value Wout, the open degree upper limit value THout may be calculated in correspondence with an output available capacity Eout, which is calculated using the open degree upper limit value THout. The output available capacity Eout is calculated as a value obtained by subtracting, from the output upper limit value Wout, the difference in the electric power balance of the first and second motor generators 71, 72. That is, the output available capacity Eout is a value indicating the magnitude of the output electric power until reaching the output upper limit value Wout. The difference in the electric power balance of the first and second motor generators 71, 72 is a value obtained by subtracting, from the value of electric power consumed by the first motor generator 71, the value of electric power generated by the second motor generator 72. When the value of electric power generated by the second motor generator 72 is greater than the value of electric power consumed by the first motor generator 71, the difference in the electric power balance is a negative value. Further, instead of calculating the open degree upper limit value THin in correspondence with the input upper limit value Win, the open degree upper limit value THin may be calculated in correspondence with an input available capacity Ein, which is calculated using the open degree upper limit value THin. The input available capacity Ein is calculated as the difference obtained by subtracting, from the input upper limit value Win, the difference in the electric power balance of the first and second motor generators 71, 72. That is, the input available capacity Ein is a value indicating the magnitude of the input electric power until reaching the input upper limit value Win.

Figure 9:
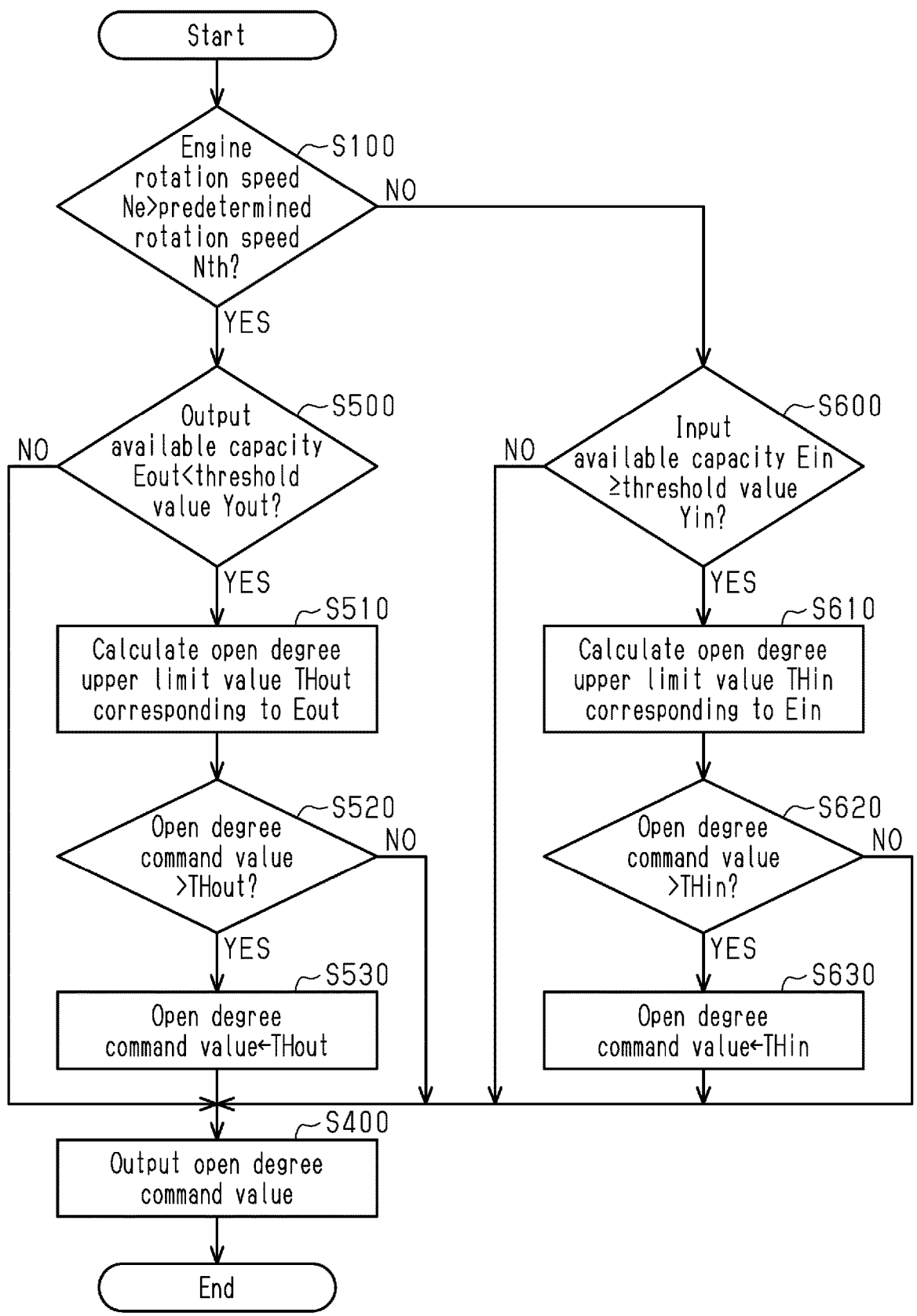
FIG. 9 is a flowchart illustrating a series of processes executed by the hybrid ECU according to a modification.

FIG. 9 shows an example of a routine executed by the hybrid ECU that executes the valve-opening limitation process using the output available capacity Eout and the input available capacity Ein. The routine shown in FIG. 9 may be replaced with the routine described with reference to FIG. 8. Same or like reference numerals are given to the processes of the routine in FIG. 9 that are the same as or similar to the processes of the routine described with reference to FIG. 8.

As shown in FIG. 9, when starting the routine, the CPU of the hybrid ECU executes the process of step S100. Then, the CPU determines whether the engine rotation speed Ne is greater than the predetermined rotation speed Nth in the process of step S100. When determining that the engine rotation speed Ne is greater than the predetermined rotation speed Nth in step S100 (step S100: YES), the CPU of the hybrid ECU advances the process to step S500.

The CPU determines whether the output available capacity Eout is less than a threshold value Yout in the process of step S500. The threshold value Yout is used to determine whether the valve-opening limitation process needs to be executed. The threshold value Yout is set, using the result of an experiment conducted in advance, to a magnitude that allows for the determination that the output from the battery 77 does not exceed the output upper limit value Wout even if the valve-opening limitation process is not executed when the output available capacity Eout is greater than or equal to the threshold value Yout.

When determining that the output available capacity Eout is less than the threshold value Yout in the process of step S500 (step S500: YES), the CPU advances the process to step S510. In the process of S510, the CPU calculates the open degree upper limit value THout corresponding to the output available capacity Eout. In reference to a calculation map stored in the ROM, the CPU uses the output available capacity Eout and the engine rotation speed Ne to calculate the open degree upper limit value THout. The calculation map is created from the result of an experiment conducted in advance.

The open degree upper limit value THout calculated in reference to the calculation map decreases as the output available capacity Eout decreases. Further, the open degree upper limit value THout calculated in reference to the calculation map decreases as the engine rotation speed Ne increases.

When calculating the open degree upper limit value THout in step S510, the CPU advances the process to step S520. In the process of step S520, the CPU determines whether the open degree command value, which is a command value of the open degree of the throttle valve 16, is greater than the open degree upper limit value THout.

When determining that the open degree command value is greater than the open degree upper limit value THout in the step S520 (step S520: YES), the CPU advances the process to step S530. In the process of step S530, the CPU updates the open degree command value to a value equivalent to the open degree upper limit value THout. Then, the CPU advances the process to step S400. When determining that the open degree command value is less than or equal to the open degree upper limit value THout in the process of step S520 (step S520: NO), the CPU advances the process to step S400 without executing the process of step S530. When outputting the open degree command value in this manner, the CPU ends the routine.

In the routine, the processes from step S510 to step S530 correspond to the second valve-opening limitation process that limits an increase in the throttle open degree by setting the open degree upper limit value THout calculated in correspondence with the output available capacity Eout and the engine rotation speed Ne and by implementing an upper limit guard such that the open degree command value does not exceed the open degree upper limit value THout.

Thus, the hybrid ECU executes the second valve-opening limitation process, as the valve-opening limitation process, to limit an increase in the throttle open degree using the open degree upper limit value THout calculated in correspondence with the output available capacity Eout when the engine rotation speed Ne is greater than the predetermined rotation speed Nth. When determining that the output available capacity Eout is greater than or equal to the threshold value Yout in the process of step S500 (step S500: NO), the valve-opening limitation process does not need to be executed. In this case, the CPU thus advances the process to step S400 to output the open degree command value without executing the processes from step S510 to step S530.

When determining that the engine rotation speed Ne is less than or equal to the predetermined rotation speed Nth in step S100 (step S100: NO), that is, when the engine friction torque decreases as the throttle open degree increases, the CPU advances the process to step S600.

The CPU determines whether the input available capacity Ein is greater than or equal to a threshold value Yin in the process of step S600. The input available capacity Ein and the threshold value Yin are both negative values. Thus, when the input available capacity Ein is greater than or equal to the threshold value Yin, the magnitude of the input to the battery 77 does not exceed the magnitude of the input specified by the threshold value Yin. The threshold value Yin is used to determine whether the valve-opening limitation process needs to be executed. The threshold value Yin is set, using the result of an experiment conducted in advance, to a magnitude that allows for the determination that the input to the battery 77 does not exceed the input available capacity Ein even if the valve-opening limitation process is not executed when the input available capacity Ein is less than the threshold value Yin.

When determining that the input available capacity Ein is greater than or equal to the threshold value Xin in the process of step S600 (step S600: YES), the CPU advances the process to step S610. In the process of S610, the CPU calculates the open degree upper limit value THin corresponding to the input available capacity Ein. The open degree upper limit value THin is the upper limit value of the throttle open degree set such that the magnitude of the input to the battery 77 does not exceed the input available capacity Ein. In reference to a calculation map stored in the ROM, the CPU uses the input available capacity Ein and the engine rotation speed Ne to calculate the open degree upper limit value THin. The calculation map is created from the result of an experiment conducted in advance.

The open degree upper limit value THin calculated in reference to the calculation map decreases as the input available capacity Ein increases (i.e., as the absolute value of the input available capacity Ein decreases and the magnitude of a redundant force that can be input decreases). Further, the open degree upper limit value THin calculated in reference to the calculation map decreases as the engine rotation speed Ne decreases.

When calculating the open degree upper limit value THin in step S610, the CPU advances the process to step S620. In the process of step S620, the CPU determines whether the open degree command value, which is a command value of the open degree of the throttle valve 16, is greater than the open degree upper limit value THin.

When determining that the open degree command value is greater than the open degree upper limit value THin in the step S620 (step S620: YES), the CPU advances the process to step S630. In the process of step S630, the CPU updates the open degree command value to a value equivalent to the open degree upper limit value THin. Then, the CPU advances the process to step S400.

When determining that the open degree command value is less than or equal to the open degree upper limit value THin in the process of step S620 (step S620: NO), the CPU advances the process to step S400 without executing the process of step S630. When outputting the open degree command value in this manner, the CPU ends the routine.

That is, the processes from step S610 to step S630 correspond to the first valve-opening limitation process that limits an increase in the throttle open degree by setting the open degree upper limit value THin calculated in correspondence with the input available capacity Ein and the engine rotation speed Ne and by implementing an upper limit guard such that the open degree command value does not exceed the open degree upper limit value THout.

Thus, the hybrid ECU executes the first valve-opening limitation process, as the valve-opening limitation process, to limit an increase in the throttle open degree using the open degree upper limit value THin calculated in correspondence with the input available capacity Ein when the engine rotation speed Ne is less than or equal to the predetermined rotation speed Nth. When determining that the input available capacity Ein is less than the threshold value Yin in the process of step S600 (step S600: NO), the valve-opening limitation process does not need to be executed. In this case, the CPU thus advances the process to step S400 to output the open degree command value without executing the processes from step S610 to step S630.

Employing such a configuration provides the following advantages (5) and (6) in addition to the above-described advantages (1) and (2).

(5) The magnitude of input electric power until reaching the input upper limit value Win (i.e., the input available capacity Ein) is calculated using the electric power balance in the first and second motor generators 71, 72 and the input upper limit value Win. In other words, the input available capacity Ein is calculated using the input upper limit value Win, the value of electric power consumed by the first motor generator 71, and the value of electric power generated by the second motor generator 72. Setting the open degree upper limit value THin (i.e., the upper limit value of the throttle open degree) from the input available capacity Ein calculated in this manner sets the open degree upper limit value THin to be more based on actual conditions than setting the open degree upper limit value THin only from the input upper limit value Win and the engine rotation speed Ne.

(6) The magnitude of output electric power until reaching the output upper limit value Wout (i.e., the output available capacity Eout) is calculated using the electric power balance in the first and second motor generators 71, 72 and the output upper limit value Wout. In other words, the output available capacity Eout is calculated using the output upper limit value Wout, the value of electric power consumed by the first motor generator 71, and the value of electric power generated by the second motor generator 72. Setting the open degree upper limit value THout from the output available capacity Eout calculated in this manner sets the open degree upper limit value THout to be more based on actual conditions than setting the open degree upper limit value THout only from the output upper limit value Wout and the engine rotation speed Ne.

In the above-described embodiment, as described with reference to FIG. 5, the direction in which the engine friction torque changes due to an increase in the throttle open degree when the engine rotation speed Ne becomes greater than the predetermined rotation speed Nth is opposite from the one when the engine rotation speed Ne is less than the predetermined rotation speed Nth. Depending on the specification of the engine or the manner of using the engine, such reverse does not occur in the direction in which the engine friction torque changes due to an increase in the throttle open degree. For example, even in the same type of the engine 10 of the above-described embodiment, when the region of a rotation speed that is higher than the predetermined rotation speed Nth is not used in the vehicle, the direction in which the engine friction torque changes due to an increase in the throttle open degree is not reversed due to the running state of the engine.

When the direction in which the engine friction torque changes due to an increase in the throttle open degree is not reversed, the first valve-opening limitation process that prevents overcharging and the second valve-opening limitation process that prevents overdischarging do not need to be selectively used depending on the engine rotation speed Ne.

Thus, the process of step S100 and the processes from step S200 to step S230 described with reference to FIG. 8 may be omitted, and the processes from step S300 to step S330 and the process of step S400 may be executed as the valve-opening limitation process.

In the same manner, the process of step S100 and the processes from step S500 to step S530 described with reference to FIG. 9 may be omitted, and the processes from step S600 to step S630 and the process of step S400 may be executed as the valve-opening limitation process.

That is, the second valve-opening limitation process that prevents overdischarging does not necessarily have to be implemented.

In the above-described embodiment, when the shift lever 96 is at the M-position and the shift range is the manual range, the control mode of the hybrid vehicle switches to the manual transmission mode so that the driver becomes able to change the virtual gear position by operating the selection device 95. The switching of the control mode to the manual transmission mode that allows the driver to change the virtual gear position by operating the selection device 95 may be performed by operating the shift lever 96 as described above. For example, when the shift lever 96 is at the D-position and the shift range is the drive range, the control mode may be switched to the manual transmission mode when the upshift paddle 51 or the downshift paddle 52 is operated. Alternatively, an additional switch used to switch the control mode to the manual transmission mode may be provided. In this case, when the switch is operated, the control mode is switched to the manual transmission mode.

In the above-described embodiment, the manual transmission mode is used to change the virtual gear position one by one and selects a certain gear position by operating the upshift paddle 51, operating the downshift paddle 52, operating the shift lever 96 to the plus position, or operating the shift lever 96 to the minus position. The control to achieve a change in the virtual gear position in order to change the braking force caused by engine braking does not have to be performed in such a manner. For example, the control to achieve a change in the virtual gear position in order to change the braking force caused by engine braking may be performed even by a control to select an upper limit value of the virtual gear position selected by operating the selection device 95 even in an automatic speed-changing control that automatically selects the virtual gear position basically using the vehicle speed SP, the accelerator operation amount Acc, and the like.

That is, the configuration that can have the same problem as the above-described embodiment is not limited to the hybrid vehicle that executes the manual transmission mode like in the above-described embodiment. Thus, the configuration that eliminates the problem by executing the same valve-opening limitation process as the routine described with reference to FIGS. 8 and 9 is not limited to the hybrid vehicle that executes the same manual transmission mode as the above-described embodiment.

In the above-described embodiment, the gate-type selection device 95 is used to guide the shift lever 96 with the shift gate 97. Such a selection device 95 does not have to be included in the hybrid vehicle capable of executing the same valve-opening limitation process as the above-described embodiment. For example, the selection device may include a button that corresponds to each shift range. In this case, the button is operated to select the shift range. Alternatively, the selection device may include an additional button used to select the parking range while including the shift lever 96 and the shift gate 97. As another option, the selection device may be of a rotary switch type in which the shift range is selected by rotating a knob to a position corresponding to each shift position arranged around the knob.

The device operated to request a change in the virtual gear position may be changed. For example, the shift gate 97 does not have to include the plus position and the minus position. Even in this case, the virtual gear position can be changed by operating the upshift paddle 51 or the downshift paddle 52. Alternatively, a configuration may be employed in which the plus position and the minus position are provided in the shift gate 97 and the upshift paddle 51 and the downshift paddle 52 are not provided in the shift gate 97. In this case, the virtual gear position may be changed by operating the shift lever 96. Without such a configuration, the device simply needs to accept an operation that requests a change in the virtual gear position.

In the automatic transmission mode, the virtual gear position may be switched in correspondence with the vehicle speed SP and the accelerator operation amount Acc through a control according to the virtual gear position like in the automatic speed-changing control for the vehicle that includes the automatic transmission. In such a case, the same problem as the above-described embodiment may occur when the accelerator operation in the automatic transmission mode is deactivated. To solve such a problem, the same solution as the above-described embodiment may be employed in the automatic transmission mode.

The transmission 90 capable of providing four gear positions is described as a transmission in the above-described embodiment. Instead, a transmission capable of providing a smaller or larger number of gear positions may be used. Further, the number of virtual gear positions and the manner of allocating the virtual gear position corresponding to each gear position of a transmission may be changed. As another option, a transmission capable of providing multiple gear positions does not have to be used. That is, for example, a speed-reducing mechanism with a fixed gear ratio may be used.

The hybrid vehicle does not have to include a transmission. Even in a configuration in which the gear position is not switched by a transmission, the virtual gear position can be switched by controlling the first motor generator 71.

In the hybrid vehicle, multiple virtual gear positions do not have to be selected. For example, the total deceleration ratio may be controlled so as to be fixed to a constant value when an engine braking mode is selected to operate engine braking using a selection device. In a hybrid vehicle with such a configuration, the same problem as the above-described embodiment may occur. Thus, the same solution as the above-described embodiment may be employed.

Instead of performing control so as to fix the total deceleration ratio, engine braking may be operated by executing motoring that keeps the engine rotation speed at a constant value when the accelerator operation is deactivated. Even in a case where an increase request for the throttle open degree is issued when the engine braking is operated by such a control, the same problem as the above-described embodiment may occur. Thus, the same solution as the above-described embodiment may be applied to a hybrid vehicle for which such a control is performed.

If overcharging or overdischarging can be prevented, the manner of limiting an increase in the throttle open degree in the valve-opening limitation process may be changed. For example, an increase in the throttle open degree does not have to be limited by calculating the upper limit value. Instead, the open degree command value may be uniformly decreased by determining, when the increase request for the throttle open degree is issued, whether an increase in the open degree should be limited in correspondence with the input upper limit value Win or the output upper limit value Wout. More specifically, for example, such limitation is achieved by multiplying the open degree command value by a coefficient that is larger than 0 and smaller than 1.

When the input upper limit value Win is greater than or equal to a threshold value and the magnitude of electric power that can be input to the battery 77 is small, the throttle open degree may be prohibited from being increased. Further, when the output upper limit value Wout is less than or equal to a threshold value and the magnitude of electric power that can be output from the battery 77 is small, the throttle open degree may be prohibited from being increased.

In the hybrid vehicle of the above-described embodiment, the controller for the hybrid vehicle is the hybrid ECU 200, and the engine ECU 100, the motor ECU 300, the battery ECU 400, and the shift ECU 500 are also provided. Instead, the controller for the hybrid vehicle may be a single controller including the function of one of these ECUs, multiple of these ECUs, or all of the ECUs.

The execution device is not limited to the device that includes the CPU 200*a* and the ROM 200*b* and executes software processing. For example, a dedicated hardware circuit (such as an ASIC) may be provided to execute, through hardware processing, at least part of the processes executed in the above-described embodiment. That is, the execution device simply needs to be circuitry including any one of the following configurations (a) to (c): (a) circuitry including a processor that executes all of the above-described processes according to programs and a program storage device such as a ROM that stores the programs; (b) circuitry including a processor and a program storage device that execute a part of the above-described processes according to the programs and a dedicated hardware circuit that executes the remaining processes; and (c) circuitry including a dedicated hardware circuit that executes all of the above-described processes. One or more software execution devices including a processor and a program storage device and one or more dedicated hardware circuits may be provided.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for a hybrid vehicle, the hybrid vehicle including:
   a power distribution-integration mechanism including a ring gear configured to work in an interlocked manner with a driven wheel, a sun gear configured to rotate at a center of the ring gear, a pinion gear located between the sun gear and the ring gear and configured to orbit around the sun gear, and a planetary carrier configured to rotate as the pinion gear orbits;
   an engine including an output shaft coupled to the planetary carrier;
   a first motor generator configured to work in an interlocked manner with the sun gear;
   a second motor generator configured to work in an interlocked manner with the ring gear;
   a battery connected to the first motor generator and the second motor generator; and
   a battery controller configured to calculate a state of charge of the battery, an input upper limit value of the battery, and an output upper limit value of the battery using a voltage in the battery, a temperature of the battery, and an electric power balance in the first and second motor generators,
   the controller comprising:
   circuitry configured to control the first motor generator and the second motor generator such that electric power input to the battery does not exceed the input upper limit value and electric power output from the battery does not exceed the output upper limit value, wherein
   the circuitry is configured to:
   control the engine and the first motor generator such that an engine rotation speed becomes close to a target engine rotation speed, the target engine rotation speed being set using a requested drive force;
   control the second motor generator such that the requested drive force is achieved by power transmitted from the ring gear to the driven wheel;
   execute motoring to rotate the output shaft using the first motor generator in a state in which combustion operation of the engine is stopped, thereby causing a braking force generated by friction of the engine to act on the driven wheel; and
   execute a valve-opening limitation process that limits an increase in a throttle open degree in correspondence with the input upper limit value upon issuance of an increase request for the throttle open degree that is not based on an operation of requesting a change in the braking force performed by a driver during the execution of the motoring.

2. The controller according to claim 1, wherein
   the circuitry is configured to execute a gear position fixing control that fixes a total deceleration ratio at a value corresponding to a gear position of gear positions that has been selected by the driver and changes the engine rotation speed in correspondence with a vehicle speed, the total deceleration ratio being a ratio of the engine rotation speed and a rotation speed of the driven wheel, and
   the operation of requesting a change in the braking force performed by the driver includes a changing operation for the gear position, an accelerator operation, and a braking operation that are performed by the driver during the execution of the gear position fixing control.

3. The controller according to claim 1, wherein the circuitry is configured to, in the valve-opening limitation process:
   set an upper limit value of the throttle open degree using the input upper limit value and the engine rotation speed; and
   limit the throttle open degree to a range less than or equal to the upper limit value.

4. The controller according to claim 1, wherein the circuitry is configured to, in the valve-opening limitation process:

calculate an input available capacity of the battery using the electric power balance in the first and second motor generators and the input upper limit value;

set an upper limit value of the throttle open degree using the input available capacity and the engine rotation speed; and limit the throttle open degree to a range less than or equal to the upper limit value.

5. The controller according to claim 1, wherein
the engine is configured such that the friction of the engine is decreased by an increase in the throttle open degree when the engine rotation speed is less than a predetermined rotation speed and the friction of the engine is increased by an increase in the throttle open degree when the engine rotation speed is greater than the predetermined rotation speed, the valve-opening limitation process is a first valve-opening limitation process, and the circuitry is configured to, upon issuance of the increase request for the throttle open degree that is not based on the operation of requesting a change in the braking force performed by the driver during the execution of the motoring:

execute a second valve-opening limitation process that limits an increase in the throttle open degree in correspondence with the output upper limit value when the engine rotation speed is greater than the predetermined rotation speed; and execute the first valve-opening limitation process when the engine rotation speed is less than or equal to the predetermined rotation speed.

6. The controller according to claim 5, wherein the circuitry is configured to, in the second valve-opening limitation process:

set an upper limit value of the throttle open degree using the output upper limit value and the engine rotation speed; and limit the throttle open degree to a range less than or equal to the upper limit value.

7. The controller according to claim 5, wherein the circuitry is configured to, in the second valve-opening limitation process:

calculate an output available capacity of the battery using the electric power balance in the first and second motor generators and the output upper limit value;

set an upper limit value of the throttle open degree using the output available capacity and the engine rotation speed; and limit the throttle open degree to a range less than or equal to the upper limit value.

8. A control method for a hybrid vehicle, the hybrid vehicle including:

a power distribution-integration mechanism including a ring gear configured to work in an interlocked manner with a driven wheel, a sun gear configured to rotate at a center of the ring gear, a pinion gear located between the sun gear and the ring gear and configured to orbit around the sun gear, and a planetary carrier configured to rotate as the pinion gear orbits;

an engine including an output shaft coupled to the planetary carrier;

a first motor generator configured to work in an interlocked manner with the sun gear;

a second motor generator configured to work in an interlocked manner with the ring gear; and a battery connected to the first motor generator and the second motor generator, the method comprising:

calculating a state of charge of the battery, an input upper limit value of the battery, and an output upper limit value of the battery using a voltage in the battery, a temperature of the battery, and an electric power balance in the first and second motor generators;

controlling the first motor generator and the second motor generator such that electric power input to the battery does not exceed the input upper limit value and electric power output from the battery does not exceed the output upper limit value;

controlling the engine and the first motor generator such that an engine rotation speed becomes close to a target engine rotation speed, the target engine rotation speed being set using a requested drive force;

controlling the second motor generator such that the requested drive force is achieved by power transmitted from the ring gear to the driven wheel;

executing motoring to rotate the output shaft using the first motor generator in a state in which combustion operation of the engine is stopped, thereby causing a braking force generated by friction of the engine to act on the driven wheel; and executing a valve-opening limitation process that limits an increase in a throttle open degree in correspondence with the input upper limit value upon issuance of an increase request for the throttle open degree that is not based on an operation of requesting a change in the braking force performed by a driver during the execution of the motoring.

* * * * *